(12) United States Patent
McAdam (10) Patent No.: US 9,804,285 B2
(45) Date of Patent: Oct. 31, 2017

(54) METHOD FOR MONITORING THE OPERATION OF A METAL DETECTION SYSTEM AND METAL DETECTION SYSTEM

(71) Applicant: Mettler-Toledo Safeline Ltd., Greater Manchester (GB)

(72) Inventor: Stephen McAdam, Cheshire (GB)

(73) Assignee: Mettler-Toledo Safeline Ltd., Salford, Manchester (GB)

( * ) Notice: Subject to any disclaimer, the term of this patent is extended or adjusted under 35 U.S.C. 154(b) by 161 days.

(21) Appl. No.: 14/666,351

(22) Filed: Mar. 24, 2015

(65) Prior Publication Data

US 2015/0276964 A1    Oct. 1, 2015

(30) Foreign Application Priority Data

Mar. 25, 2014    (EP) .................................... 14161582

(51) Int. Cl.
*G01V 3/10*    (2006.01)
(52) U.S. Cl.
CPC ................ *G01V 3/10* (2013.01); *G01V 3/107* (2013.01)
(58) Field of Classification Search
CPC .................................. G01V 3/10; G01V 3/107
See application file for complete search history.

(56) References Cited

U.S. PATENT DOCUMENTS

| | | | |
|---|---|---|---|
| 5,703,514 | A | 12/1997 | Hsu et al. |
| 7,432,715 | B2 | 10/2008 | Stamatescu |
| 8,314,713 | B2 | 11/2012 | McAdam |
| 2009/0167299 | A1* | 7/2009 | Nishio .................. G01V 3/104 324/239 |

(Continued)

FOREIGN PATENT DOCUMENTS

JP    59-60277 A    4/1984

*Primary Examiner* — Haidong Zhang
(74) *Attorney, Agent, or Firm* — Standley Law Group LLP (57) ABSTRACT

A balanced coil system (2) of a metal detection system has a transmitter coil (21) connected to a first transmitter unit (1), to provide a transmitter signal (s1) comprising at least first and second operating frequencies ($f_{TX1}$, $f_{TX2}$). First and second receiver coils (22, 23), which compensate one another when the system is in balance, provide output signals (s22, s23) to a receiver unit (3). The respective operating frequencies are applied separately together each with a monitoring frequency ($f_{MON}$) to inputs of first and second modulation units (52, 53), which provide first and a second modulated monitoring signals ($s_{M1}$, $s_{M2}$), each comprising a first or second modulated monitoring frequency ($f_{MM1}$, $f_{MM2}$) without a carrier. When applied to a summation unit (54), the modulated monitoring signals result in a combined output signal ($s_{M12}$) that is applied to a monitoring coil (24), inductively coupled with at least one of the receiver coils.

12 Claims, 3 Drawing Sheets

(56) References Cited

U.S. PATENT DOCUMENTS

| | | | | |
|---|---|---|---|---|
| 2009/0318098 A1* | 12/2009 | Stamatescu | ............ | G01V 3/104 455/118 |
| 2012/0086455 A1* | 4/2012 | McAdam | ............... | G01V 3/107 324/326 |
| 2012/0098667 A1* | 4/2012 | McAdam | ............... | G01V 3/107 340/635 |

* cited by examiner

METHOD FOR MONITORING THE OPERATION OF A METAL DETECTION SYSTEM AND METAL DETECTION SYSTEM

CROSS-REFERENCE TO RELATED APPLICATIONS

This application claims a right of priority under 35 USC 119 from EP 14161582.3, filed on 25 Mar. 2014, which is incorporated by reference as if fully recited herein.

TECHNICAL FIELD

The invention relates to a method for monitoring the operation of a multiple frequency metal detection apparatus and to a multiple frequency metal detection apparatus that implements this method.

BACKGROUND

An industrial metal detection system is used to detect and reject unwanted metal contamination. When properly installed and operated, it will help reducing metal contamination and improving food safety. Most modern metal detectors utilise a search head comprising a "balanced coil system". Detectors of this design are capable of detecting all metal contaminant types including ferrous, nonferrous and stainless steels in a large variety of products such as fresh and frozen products.

A metal detection system that operates according to the "balanced coil"-principle typically comprises three coils that are wound onto a non-metallic frame, each exactly parallel with the other. The transmitter coil located in the center is energised with a high frequency electric current that generates a magnetic field. The two coils on each side of the transmitter coil act as receiver coils. Since the two receiver coils are identical and installed with the same distance from the transmitter coil, an identical voltage is induced in each of them. In order to receive an output signal that is zero when the system is in balance, the receiver coils are connected in series with the second receiver coil having an inversed sense of winding. Hence the voltages induced in the receiver coils, that are of identical amplitude and inverse polarity are cancelling out one another in the event that the system, in the absence of metallic contaminations, is in balance.

As a particle of metal passes through the coil arrangement, the high frequency field is disturbed first near one receiver coil and then near the other receiver coil. While the particle of metal is conveyed through the receiver coils the voltage induced in each receiver coil is changed (by nanovolts). This change in balance results in a signal at the output of the receiver coils that can be processed, amplified and subsequently be used to detect the presence of metal contamination.

The signal processing channels split the received signal into two separate components that are 90° apart from one another. The resultant vector has a magnitude and a phase angle, which is typical for the products and the contaminants that are conveyed through the coils. In order to identify a metal contaminant "product effects" need to be removed or reduced. Knowing the phase of the product the corresponding signal vector can be reduced. Eliminating unwanted signals from the signal spectrum thus leads to higher sensitivity for signals originating from contaminants.

In order to obtain information about the sort and volume of the contaminants and in order to at least partially eliminate unwanted signals caused by "product effects" or disturbances such as vibrations, it is important that the system processes the measured signals accurate signal amplitude and signal phase.

In the event that system deficiencies occur that degrade the amplitude or the phase of the processed signals, then the measurement results, which reflect the quality of the production process, are no longer reliable. Either the system may not raise an alarm if a contamination is present (false negative). Alternatively the system may raise an alarm if a contamination is not present (false positive). Hence, advanced metal detection systems are provided with equipment that allows monitoring the operation of the metal detection system.

A method for monitoring the operation of a metal detection system is disclosed in EP2439560B1. According to this method a carrier signal with the transmitter frequency and a monitoring signal with a monitoring frequency are provided to a modulation unit that suppresses the carrier signal and that provides a modulated monitoring signal, which is applied to a monitoring coil that is inductively coupled with one of the receiver coils, whose output signals are demodulated in a demodulation unit that provides the demodulated monitoring signal, which is compared in phase and/or in amplitude with a reference. In the event that a deviation between the demodulated monitoring signal and the reference exceeds a given threshold value, then an alarm signal is provided.

In WO2006/021045A1 it is explained that simultaneous operation on two frequencies enables a metal detection system to achieve higher performance both in target discrimination and rejection of false signals caused by the environment. Further, it is outlined that difficulties in the construction of multiple frequency metal detectors have prevented their proliferation, since for each extra frequency added to a conventional metal detector, a number of processing units would have to be added, thus increasing both the cost and the complexity of the detectors.

Furthermore, in view of the disclosure in EP2439560B1, such a multiple frequency metal detection system should also be equipped with a monitoring system. However, as described in WO200621045A1, adding further complexity to the metal detection system would not be desirable.

SUMMARY

The present invention is therefore based on the object of providing a method for monitoring the operation of a multiple frequency metal detection system as well as on the object of providing a multiple frequency metal detection system operating according to this method.

Particularly, the present invention is based on the object of providing a method that allows detecting malfunctions that would prevent the metal detection system from correctly detecting product contaminations for all system configurations and operating modes.

Further, the present invention is based on the object of providing a method that can be implemented with little effort and a low number of additional hardware units. The complexity of the inventive metal detection system should not rise proportionally to the enhanced performance but should rather remain at the same level.

The above and other objects of the present invention are achieved by an improved method for operating of a metal detection system and a metal detection system operating according to this method, as defined in the appended claims.

The method serves for monitoring the operation of a metal detection system that is equipped with a balanced coil system comprising a transmitter coil that is connected to a first transmitter unit, which provides a transmitter signal comprising at least a first and a second operating frequency, and a first and a second receiver coil that provide output signals to a receiver unit, which compensate one another in the event that the metal detection system is in balance.

According to the invention
- a first signal with the first operating frequency and a monitoring signal with a monitoring frequency are applied to inputs of a first modulation unit that outputs a first modulated monitoring signal comprising a first modulated monitoring frequency without a carrier;
- a second signal with the second operating frequency and the monitoring signal with the monitoring frequency are applied to inputs of a second modulation unit that outputs a second modulated monitoring signal comprising a second modulated monitoring frequency without a carrier.

The modulated monitoring frequencies are sideband signals that result after modulating the operating frequencies with the monitoring frequency. The carrier frequency that relates to the operating frequencies is suppressed in the modulated monitoring signals.

The first and the second modulated monitoring signals are then applied to inputs of a summation unit, which outputs a combined output signal that comprises the two modulated monitoring frequencies and that is applied to a monitoring coil that is inductively coupled with at least one of the receiver coils, whose output signals are demodulated in a demodulation unit, which provides for each one of the operating frequencies a demodulated monitoring signal, which are individually compared in phase and/or in amplitude with a reference, such as the monitoring signal in order to obtain performance information.

In the event that the comparison of the demodulated monitoring signals with the reference, preferably the monitoring signal received from the second transmitter unit indicate differences in amplitude or phase then the obtained product signals can be corrected accordingly or, e.g. if a deviation exceeds a given threshold value, then an alarm can be triggered.

According to the invention for each operating frequency a modulated monitoring signal is provided that preferably consists of a single sideband that is offset by the monitoring frequency from the operating frequency. Any configuration of the metal detection system with any operating frequencies selected can precisely be monitored so that any irregularity can be detected. The behaviour of the metal detection system is therefore not only monitored for a single frequency but for every combination of frequencies.

Hence, the inventive method allows measuring the performance of the metal detection system for each operating frequency of a pair of selected operating frequencies and verifying, if the measured performance lies within the specifications. It can be checked whether the transmitter part and the receiver part of the system operate correctly. Further it can be checked whether other disturbances, such as influences from the installation site, e.g. vibrations or magnetic fields, have a negative impact on the measurement process.

Further, the object of the invention is efficiently reached. In a preferred embodiment XOR-gates are used as modulation units. In this way the carrier suppressed signal can be generated most efficiently for each operating frequency. The modulated monitoring signals generated for each operating frequency are then applied to the summation unit, which is preferably a multiplexer that, in accordance with a multiplexing frequency, alternatingly switches the first modulated monitoring signal and the second modulated monitoring signal to its output. The output signal of the multiplexer, which comprises the desired modulated monitoring frequencies that can be amplified and filtered in further stages before it is applied to the monitoring coil. The modulated monitoring signals are interlaced by the multiplexer and efficiently integrated into a single signal.

The summation unit preferably consists of gates that process the signals as follows. The first modulated monitoring signal and the reference signal with the reference frequency are applied to the inputs of a first gate having an AND function. The second modulated monitoring signal and the reference signal with the reference frequency are applied to the inputs of a second gate having an AND function. The reference signals at the inputs of the first and second gate are inverted to relative to one another, e.g. by applying one of the signals via an inverter to the related gate. The output signals of the first and second gates are applied to the inputs of a third gate having an OR function. Consequently, only the first or the second modulated monitoring signal is present at the inputs and the output of the third gate at a time.

In a further preferred embodiment, the operating frequencies, the monitoring frequency and the multiplexing frequency are derived by division from a common reference frequency. The operating frequencies are preferably by a factor in the range from 30-600 lower than the reference frequency. With this measure, in all operating modes phase coherent processing of digital signals is obtained with high stability and optimal accuracy. The divider ratios and the reference frequency are selected in such a way that all desired operating frequencies can be generated.

While the process of measuring the performance of the metal detection system is intrusive and thus very reliable, any disturbing impact of this process on the measurement process is avoided. For this purpose the signals introduced into the balanced coil system are selected in such a way that no interference with the measurement process occurs. The monitoring frequency is selected to be above the frequency range of the product signals that are induced into the balanced coil system by objects measured during the operation of the metal detection system.

Decoupling the monitoring signal from the measurement process is also achieved by the placement and installation of the monitoring coil, which is preferably wound around a tail of one of the receiver coils that is attached to the receiver board. A possibly remaining influence of the monitoring signal can be eliminated with the final calibration of the metal detection system. On the other hand, measurement process will also not disturb the monitoring process, since the measured products will not travel through the monitoring coil.

The monitoring frequency is selected in the range of 50 Hz to 1000 Hz, preferably in the range between 500 Hz and 700 Hz. For example a frequency of 615 Hz is selected. Preferably, the monitoring frequency and the transmitter frequencies are selected in such a way that the transmitter frequencies, which may alter during operation, are even numbered multiples of the monitoring frequency. In this embodiment the whole system would operate phase coherent allowing additional testing for phase coherence in the signal processing unit.

The operating frequencies are applied to the transmitter units with a specific phase angle that allows precise demodulation. In a preferred embodiment the transmitter signals, which are derived from the reference frequency and exhibit a multiple each of the selected operating frequency, are selectable and applicable to a divider device, which divides each multiple by a corresponding factor in order to reach the selected operating frequency. Such a divider unit, e.g. a Johnson Ring Counter, can provide phase shifts in steps of 45° if the dividing factor is 8. A further digital frequency divider and phase shifter is disclosed in U.S. Pat. No. 5,703,514.

The first and the second modulated monitoring signals can be filtered and/or amplified in order to provide the desired modulated monitoring frequencies with desired amplitude, while suppressing disturbing frequencies. However, filters and amplifiers are preferably arranged in the signal chain, in which the combined output signal is processed.

BRIEF DESCRIPTION OF THE DRAWINGS

Some of the objects and advantages of the present invention have been stated, others will appear when the following description is considered together with the accompanying drawings, in which.

DETAILED DESCRIPTION OF THE PREFERRED EMBODIMENTS

Figure 1:
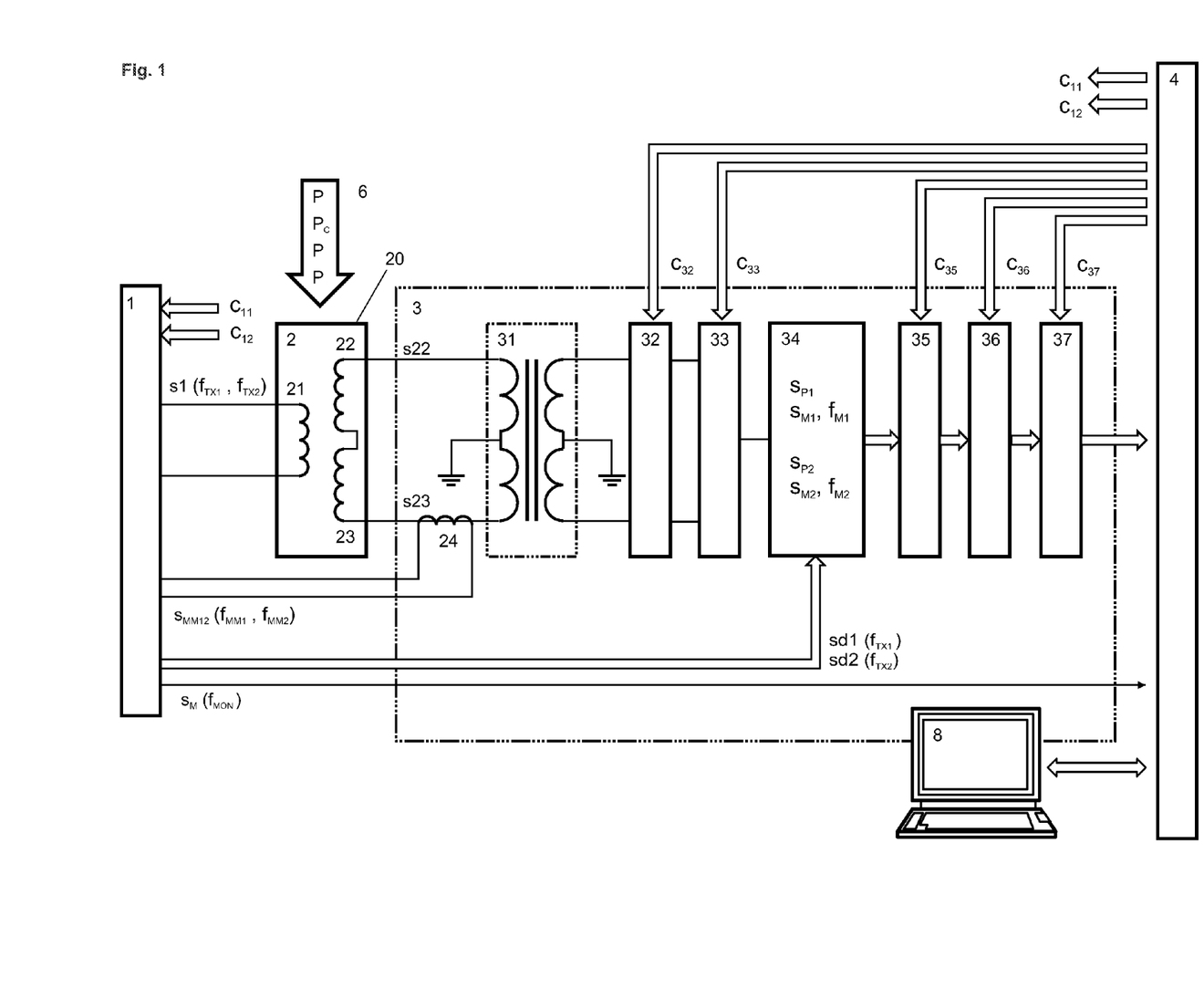
FIG. 1 shows a block diagram of an inventive metal detection system that comprises a transmitter module 1 that provides a first transmitter signal s1 with two operating frequencies $f_{TX1}$, $f_{TX2}$ applied to a transmitter coil 21 and a second transmitter signal $s_{M12}$ comprising two modulated monitoring frequencies $f_{MM1}$, $f_{MM2}$ applied to a monitoring coil 24.

FIG. 1 shows a block diagram of an inventive metal detection system, which comprises a transmitter module 1, a balanced coil system 2 with a transmitter coil 21, a first and a second receiver coil 22, 23, and a monitoring coil 24, a receiver unit 3, a signal processing unit 4, and a computer system 8 that comprises standard interfaces, input devices and output devices. FIG. 1 further shows a conveyor 6, on which products P are transferred through the transmitter coil 21 and through the receiver coils 22, 23.

Figure 2:
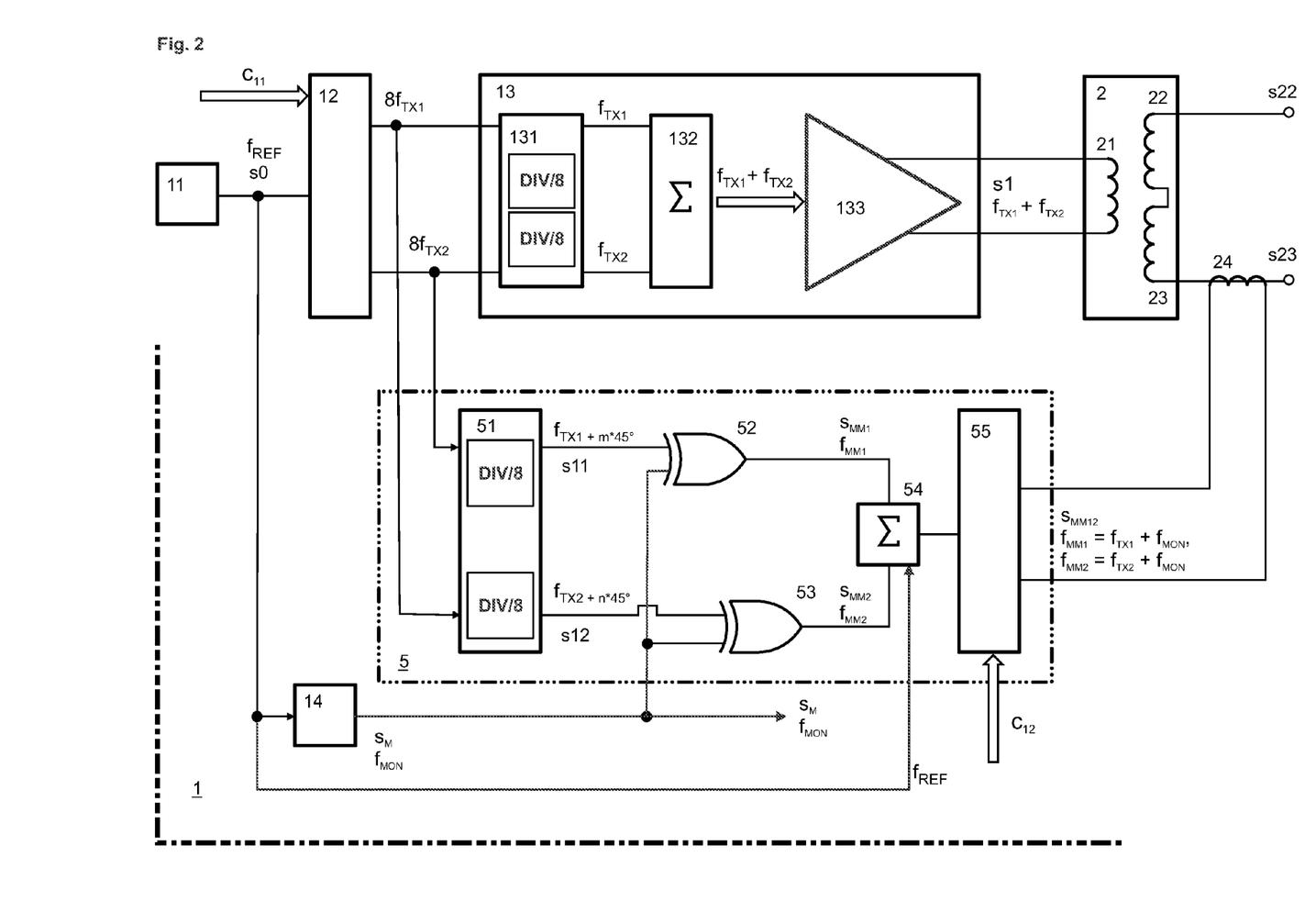
FIG. 2 shows a block diagram of the transmitter module 1 of the metal detection system of FIG. 1 in a preferred embodiment with a first transmitter unit 13 that delivers the first transmitter signal s1 and a second transmitter unit 5 that delivers the second transmitter signal $s_{M12}$.

The inventive transmitter module 1, which is shown in a preferred embodiment in FIG. 2 comprises a first transmitter unit 13 that applies a first transmitter signal s1 with two operating frequencies $f_{TX1}$, $f_{TX2}$ to the transmitter coil 21 and a second transmitter unit 5 that applies a second transmitter signal or combined output signal $s_{M12}$ with two modulated monitoring frequencies $f_{MM1}$, $f_{MM2}$ to the monitoring coil 24.

The transmitter signal s1 induces signals s22, s23 in the identical receiver coils 22, 23 that are of the same amplitude but inverse polarity as long as the system is in balance, i.e. as long as the conveyed products P are not contaminated with metals.

In the event that a product $P_C$ is contaminated with an electro-conductive object, then the signals s22, s23 in the identical receiver coils 22, 23 will change while that product $P_C$ passes through the balanced coil system 2.

As a result the operating frequencies $f_{TX1}$, $f_{TX2}$ induced in the receiver coils 22, 23 get modulated with a base band signal, whose amplitude and frequency are dependent on the property, dimension and travelling speed of the electro-conductive object or contamination.

Depending on the properties of the product $P_C$ and the contamination the signals s22, s23 induced in the receiver coils 22, 23 will change typically for both operating frequencies $f_{TX1}$, $f_{TX2}$. However, the impact on the signals s22, s23 will typically not be identical for each operating frequency $f_{TX1}$, $f_{TX2}$. Hence, for a first sort of contaminants the observation of the first operating frequency $f_{TX1}$ may be preferable, while the observation of the second operating frequency $f_{TX2}$ may be preferable for other contaminants.

Since the electro-conductive object is not travelling through the monitoring coil 24 the magnetic field of the monitoring coil 24 is not disturbed. Interferences are further avoided by placing the monitoring coil 24 outside of the frame 20, in which the transmitter coil 21 and the receiver coils 22, 23 are arranged. As shown in FIG. 1 the monitoring coil 24 is wound around the leg of the second receiver coil 23 that is connected to the receiver unit 3. Hence, products P do not travel through the monitoring coil 24 and do therefore not influence the monitoring signals.

The output signals s22, and s23 of the receiver coils 22, 23 and the combined modulated monitoring signal $s_{M12}$, which has been induced into the receiver coils 22, 23, are applied to center-tapped primary windings of a balanced transformer 31 that mirror the receiver coils 22, 23. Further, the balanced transformer 31 comprises two identical center-tapped secondary windings whose opposite tails are connected to an amplifier 32. A receiver signal $s_R$ provided by the balanced transformer 31, that contains the operating frequencies $f_{TX1}$, $f_{TX2}$, which have been modulated by the products P or contaminations Pc, and the corresponding modulated monitoring frequencies $f_{MM1}$, $f_{MM2}$ is amplified in the amplifier 32 and subsequently filtered in a filter unit 33 which provides the amplified and filtered receiver signal $s_R$ to a demodulation unit 34.

In the demodulation unit 34 the receiver signal $s_R$ is demodulated by applying demodulation signals sd1, sd2 with the demodulation frequencies, namely the operating frequencies $f_{TX1}$, $f_{TX2}$, which are supplied by the transmitter module 1.

By demodulating the receiver signal $s_R$ a first product signal $s_{P1}$ for the first operating frequency $f_{TX1}$ and a second product signal $s_{P2}$ for the second operating frequency $f_{TX2}$ are obtained.

Further for the first operating frequency $f_{TX1}$ a first demodulated monitoring signal $s_{M1}$ and for the second operating frequency $f_{TX2}$ a second demodulated monitoring signal $s_{M2}$ are obtained. The product signals $s_{P1}$ and $s_{P2}$ represent the influences of the product and contaminations Pc. The demodulated monitoring signals $s_{M1}$ and $s_{M2}$ contain information about the condition of the metal detection system and disturbing influences.

The product signals $s_{P1}$, $s_{P2}$ and the demodulated monitoring signals $s_{M1}$, $s_{M2}$ provided at the output of the demodulation unit 34, preferably in-phase and quadrature signals, are forwarded to a filter unit 35, which allows the desired signals to pass to a gain unit 36 that allows setting the amplitudes of the processed signals to a desired value. Subsequently the filtered and calibrated signals are converted in an analogue to digital converter 37 from analogue form to digital form. The output signals of the analogue to digital converter 37 are forwarded to a signal processing unit 4, such as a digital signal processor, which compares the demodulated and processed monitoring signals $s_{M1}$ and $s_{M2}$ obtained for each operating frequency $f_{TX1}$, $f_{TX2}$ with reference values. The data resulting in the evaluation process are then forwarded to a data processing unit or to a computer terminal 8. In the event that the demodulated monitoring signals $s_{M1}$ and $s_{M2}$ differ from a given reference by more than a pre-set threshold then an alarm is raised. Alternatively information gained from the demodulated monitoring signals $s_{M1}$ and $s_{M2}$ can be used for adjusting parameters applied to the transmitter module 1 or the receiver stage 3.

In order to control the measurement process the signal processor 4 is capable of controlling the functions of various modules provided in the transmitter module 1 and in the receiver unit 3. For this purpose, the signal processor 4 is forwarding a first control signal c32 to the amplifier unit 32, a second control signal c33 to the first filter unit 33, a third control signal c35 to the second filter unit 35, a fourth control signal c36 the gain unit 36 and a fifth control signal c37 to the analogue to digital converter 37. With these control signals c32, c33, c35, c36 and c37 the amplification and filter characteristics in the individual receiver units 32, 33, 35, 36 and 37 can be selected or adjusted. A sixth control signal c11 and a seventh control signal c11 are forwarded to the transmitter module 1 as described below. The mentioned control signals can be provided by the signal processor 4 as shown in FIG. 1 or by the computer system or control unit 8.

FIG. 2 shows a block diagram of the transmitter module 1 of the metal detection system shown in FIG. 1, which comprises a first transmitter unit 13 and a second transmitter unit 5.

The transmitter module 1 further comprises a reference unit 11 that provides a reference signal s0 with a reference frequency $f_{REF}$ to a frequency source 12, such as a frequency synthesiser that is controlled by the sixth control signal c11 received from the signal processor 4 or the control unit 8. The signal processor 4 or the control unit 8 can therefore select suitable operating frequencies $f_{TX1}$, $f_{TX2}$ or multiples $8f_{TX1}$, $8f_{TX2}$ thereof that are forwarded to the first transmitter unit 13 that contains a divider unit 131, a summation unit 132 and a power amplifier 133, which is providing the amplified transmitter signal s1 to the transmitter coil 21 of the balanced coil system 2. The divider unit 131 divides the multiples $8f_{TX1}$, $8f_{TX2}$ of the operating frequency $f_{TX1}$, $f_{TX2}$ by a corresponding factor in order to obtain the operating frequencies $f_{TX1}$, $f_{TX2}$, which are forwarded to the summation unit 132, which provides a single signal with both operating frequencies to the power amplifier 133. The summation unit 132 preferably operates in the same manner as the summation unit 54 that is described below.

The reference signal s0 with the reference frequency $f_{REF}$ is further provided to a divider unit 14, which divides the reference frequency $f_{REF}$ preferably by an even number thus obtaining the monitoring frequency $f_{MON}$ that is forwarded with signal $s_M$ on the one hand to the signal processor unit 4 and on the other hand to the second transmitter unit 5 which is providing a second transmitter signal, i.e. the combined output signal $s_{M12}$ comprising the two modulated monitoring frequencies $f_{MM1}$, $f_{MM2}$ to the monitoring coil 24.

In the second transmitter unit 5 a divider unit 51 is provided, which receives and divides the multiples of the operating frequency $8f_{TX1}$, $8f_{TX2}$ selected in the frequency source 12 by a corresponding factor in order to obtain the operating frequencies $f_{TX1}$, $f_{TX2}$ preferably with a predefined phase shift, with the given divisor 8 by a multiple of 45°. A corresponding first signal s11 and a second signal s12 provided by the divider unit 51 are then modulated with the monitoring frequency $f_{MON}$ as follows.

The first signal s11 with the first operating frequency $f_{TX1}$ and the monitoring signal $s_M$ with the monitoring frequency $f_{MON}$ are applied to inputs of a first modulation unit 52 that outputs a first modulated monitoring signal $s_{MM1}$ comprising a first modulated monitoring frequency $s_{MM1}$ without a carrier.

The second signal s12 with the second operating frequency $f_{TX2}$ and the monitoring signal $s_M$ with the monitoring frequency $f_{MON}$ are applied to inputs of a second modulation unit 53 that outputs a second modulated monitoring signal $s_{MM2}$ comprising a second modulated monitoring frequency $s_{MM2}$ without a carrier.

In this preferred embodiment the two modulation units 52, 53 are XOR-gates which provide first and the second modulated monitoring signals $s_{MM1}$, $s_{MM2}$ according to the double-sideband suppressed carrier principle (DSB-SC). Hence, the modulated monitoring signals $s_{MM1}$, $s_{MM2}$ comprise sidebands only, which lie outside the bandwidth of the frequency range around the modulated operating frequencies $f_{TX1}$, $f_{TX2}$, in which signals are induced by the measured and possibly contaminated products P, Pc.

The modulated monitoring signals $s_{MM1}$ and $s_{MM2}$ are applied to inputs of a summation unit 54, which outputs a combined output signal $s_{M12}$ that comprises the two modulated monitoring frequencies $f_{MM1}$ and $f_{MM2}$ and that is applied to a further processing unit 55, in which the combined output signal $s_{M12}$ is filtered and/or amplified, before it is applied to the monitoring coil 24. The further processing unit 55 is controlled by the signal processing unit 4 or the control unit 8 by means of the control signal or control bus c12.

Figure 3:
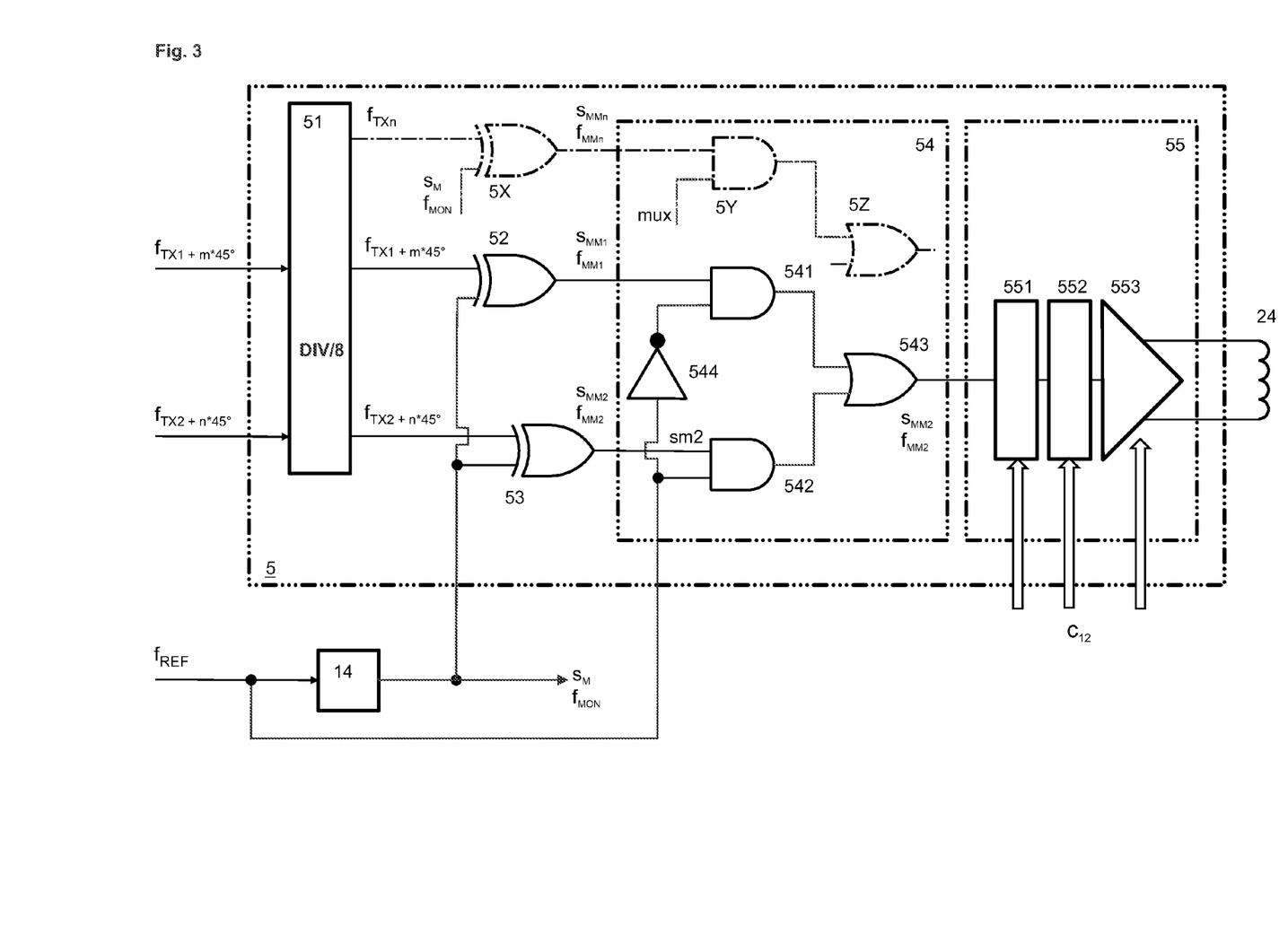
FIG. 3 shows the second transmitter unit 5 of FIG. 2 in a preferred embodiment.

FIG. 3 shows the second transmitter unit 5 of FIG. 2 with the summation unit 54 in a preferred embodiment. The summation unit 54 consists of two AND-gates 541, 542 whose outputs are connected to separate inputs of an OR-gate 543. The modulated monitoring signals $s_{MM1}$, $s_{MM2}$ provided by the modulation units 52, 53 or XOR-gates are applied to the corresponding first input of the AND-gates 541, 542. The reference frequency $f_{REF}$ is applied to the second input of the second AND-gate 542 and via an inverter 544 to the second input of the first AND-gate 541. Consequently only one of the AND-gates 541, 542 is enabled at a time and allows the related modulated monitoring signal $s_{MM1}$ or $s_{MM2}$ to pass through via the related input to the output of the OR-gate 543. Consequently corresponding to the duty cycle of the reference frequency $f_{REF}$, which is preferably 50/50, the two modulated monitoring signals $s_{MM1}$, $s_{MM2}$ appear at the output of the OR-gate 543 and form the combined output signal $s_{M12}$ that comprises the two modulated monitoring frequencies $f_{MM1}$, $f_{MM2}$.

The combined output signal $s_{M12}$ is then applied to the further processing unit 55, which is controlled by means of the control signal c12, which allows setting of parameters of a gain unit or preamplifier 551, setting of parameters of a filter unit 552 and setting of parameters of a power amplifier 553 whose output is connected to the monitoring coil 24.

Hence, with control signal c12, the second transmitter unit 5 can be adapted to any operation mode or system configuration of the metal detection system. The filter stage 552 can be set to eliminate disturbing frequencies or sidebands for any selected operating frequency $f_{TX}$ or modulated monitoring frequency $f_{MM}$.

The inventive method has been described for the application of two operating frequencies $f_{TX1}$, $f_{TX2}$. However, as symbolically shown in FIG. 3 with gates 5X, 5Y, 5Z, a further advantage of the inventive solution is that the inventive metal detection system can easily be expanded for using three or more operating frequencies $f_{TX1}$, $f_{TX2}$, $f_{TXn}$. XOR-gate 5X would serve as modulation unit that provides a modulated monitoring signal $s_{MMn}$ that is applied to the first input of AND-gate 5Y whose second input receives a multiplexing or time-sharing signal mux. The multiplexing signal mux, which would sequentially enable the AND-gates 541, 542, 5Y could be provided for example by a ring counter, such as an Overbeck counter, e.g., for four AND-gates a 4-register one-hot counter could be provided, which has an initial register value of 1000, and generates the repeating pattern: 1000, 0100, 0010, 0001, 1000, . . . . Individually controlled or addressed by this counter, the four AND-gates can sequentially be enabled so that four modulated monitoring frequencies can sequentially be switched through to the outputs of the AND-gates. The outputs of the four AND-gates could individually be connected to the inputs of two OR-gates, whose outputs are connected to a further OR-gate. Consequently, the four modulated monitoring frequencies $s_{MM1}$, $s_{MM2}$, $s_{MM3}$, $s_{MMn}$ are sequentially present in timesharing mode at the output of this further OR-gate. Hence, modulated monitoring frequencies $f_{MM1}$, $f_{MM2}$, . . . , $f_{MMn}$ can be generated in the second transmitter unit 5 for any number of operating frequencies $f_{TX1}$, $f_{TX2}$, . . . , $f_{TXn}$.

What is claimed is:

1. A system for detecting metal, comprising:
   a balanced coil system, comprising:
   a first transmitter unit, generating a transmitter signal comprising at least a first and a second operating frequency, wherein each of the operating frequencies, the monitoring frequency and the multiplexing frequency are derived by division from a common reference frequency, such that the operating frequencies are lower than the reference frequency by a factor in the range from 30 to 600;
   a transmitter coil, connected to the first transmitter unit;
   a first and a second receiver coil, the receiver coils arranged to compensate each other when the metal detection system is in balance; and
   a receiver unit, receiving, as inputs, output signals from the respective receiver coils;
   a second transmitter unit, in which:
   a first modulation unit receives as inputs a first signal with the first operating frequency and a monitoring signal with a monitoring frequency and outputs a first modulated monitoring signal comprising a first modulated monitoring frequency without a carrier; and
   a second modulation unit receives as inputs a second signal with the second operating frequency and the monitoring signal with the monitoring frequency and outputs a second modulated monitoring signal comprising a second modulated monitoring frequency without a carrier;
   a summation unit that receives the first and the second modulated monitoring signals as inputs and that provides a combined output signal that comprises the two modulated monitoring frequencies, wherein the summation unit is a multiplexer that, in accordance with a multiplexing frequency, alternatingly switches the first modulated monitoring signal and the second modulated monitoring signal to its output;
   a monitoring coil that receives the combined output signal of the summation unit, the monitoring coil being inductively coupled with at least one of the receiver coils;
   a demodulation unit that receives the output signals of the receiver coils and provides a demodulated monitoring signal for each of the two operating frequencies; and
   a signal processor that compares the respective demodulated monitoring signals with the monitoring signal, the comparison being made in phase, in amplitude or in both amplitude and phase.

2. The system of claim 1, wherein:
   each of the modulation units is an XOR-gate.

3. A method for monitoring the operation of a metal detection system having a balanced coil system in which a first transmitter unit provides a transmitter signal to a transmitter coil, the transmitter signal comprising at least a first and a second operating frequency, and in which a first and a second receiver coil, which compensate one another when the metal detection system is in balance, each provide an output signal to a receiver unit, the method comprising the steps of:
   generating, in a second transmitter unit:
   a first modulated monitoring signal, as an output of a first modulation unit that receives as inputs a first signal with the first operating frequency and a monitoring signal with a monitoring frequency, the first modulated monitoring signal comprises a first modulated monitoring frequency without a carrier; and
   a second modulated monitoring signal, as an output of a second modulation unit that receives as inputs a second signal with the second operating frequency and the monitoring signal with the monitoring frequency, the first modulated monitoring signal comprises a first modulated monitoring frequency without a carrier;
   generating a combined output signal in a summation unit that receives the first and the second modulated monitoring signals as inputs, the combined output signal comprising the two modulated monitoring frequencies, wherein the summation unit is a multiplexer that, in accordance with a multiplexing frequency, alternatingly switches the first modulated monitoring signal and the second modulated monitoring signal to its output;
   applying the combined output signal to a monitoring coil that is inductively coupled with at least one of the receiver coils;
   generating a demodulated monitoring signal for each of the operating frequencies by demodulating output signals of the receiver coils in a demodulation unit; and
   comparing the demodulated monitoring signals in phase, amplitude or both with the monitoring signal, in order to obtain performance information that is used to control the measurement process;
   wherein each of the operating frequencies, the monitoring frequency and the multiplexing frequency are derived by division from a common reference frequency, such that the operating frequencies are lower than the reference frequency by a factor in the range from 30 to 600.

4. The method of claim 3, wherein:
   in generating the respective modulated monitoring signals, each of the operating frequencies is delivered with a selected phase shift from a divider unit to the respective modulation units.

5. The method of claim 4, wherein:
   each of the modulation units is an XOR-gate.

6. The method of claim 3, wherein;
   the monitoring frequency is selected to be in a frequency range that is higher that the frequencies induced by the presence of objects in the balanced coil system during the operation of the metal detection system.

7. The method of claim 6, wherein:
the reference frequency signal, which comprises the reference frequency, is provided by a reference unit to a second divider unit, which in turn provides the monitoring signal with the monitoring frequency, in the range between 50 Hz and 1000 Hz.

8. The method of claim 7, wherein:
the monitoring frequency is in the range of 500 Hz to 700 Hz.

9. The method of claim 6, wherein:
a frequency source receives the reference frequency at an input thereof and provides selected multiples of the operating frequencies to the first and second transmitters.

10. The method of claim 3, comprising the further steps of:
modifying, by at least one of filtering or amplifying, the first modulated monitoring signal to forward the first modulated monitoring frequency with a predetermined amplitude; and
modifying, by at least one of filtering or amplifying, the second modulated monitoring signal to forward the second modulated monitoring frequency with a predetermined amplitude.

11. The method of claim 3, comprising the further step of:
modifying the combined output signal, before being applied to the monitoring coil, by at least one of: filtering or amplifying.

12. The method of claim 3, wherein:
the step of generating a combined output signal is achieved by:
applying to the inputs of a first gate, having an AND or NAND function, the first modulated monitoring signal and, by way of an inverter, the reference frequency or a derivative thereof,
applying to the inputs of a second gate, having an AND or NAND function, the second modulated monitoring signal and the reference frequency; and
applying the output signals of the first and second gates to the inputs of a third gate, having an OR function or a NAND function, the output thereof defining the combined output signal.

* * * * *